US009490905B2

United States Patent
Layec et al.

(10) Patent No.: US 9,490,905 B2
(45) Date of Patent: Nov. 8, 2016

(54) APPARATUS, METHOD AND COMPUTER PROGRAM OPERABLE TO DETERMINE ESTIMATES

(71) Applicant: Alcatel Lucent, Boulogne Billancourt (FR)

(72) Inventors: Patricia Layec, Nozay (FR); Amirhossein Ghazisaeidi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/431,032

(22) PCT Filed: Oct. 8, 2013

(86) PCT No.: PCT/EP2013/070872
§ 371 (c)(1),
(2) Date: Mar. 25, 2015

(87) PCT Pub. No.: WO2014/056864
PCT Pub. Date: Apr. 17, 2014

(65) Prior Publication Data
US 2015/0244456 A1    Aug. 27, 2015

(30) Foreign Application Priority Data

Oct. 9, 2012 (EP) .................................... 12306228

(51) Int. Cl.
*H04B 10/61* (2013.01)
*H04B 10/075* (2013.01)
(Continued)

(52) U.S. Cl.
CPC ...... *H04B 10/6162* (2013.01); *H04B 10/0795* (2013.01); *H04L 25/0202* (2013.01); *H04L 25/0238* (2013.01); *H04L 25/03292* (2013.01); *H04L 25/067* (2013.01)

(58) Field of Classification Search
CPC .......... H04B 10/0795; H04B 10/6162; H04L 25/0202; H04L 25/0238; H04L 25/03292; H04L 25/067
See application file for complete search history.

(56) References Cited

U.S. PATENT DOCUMENTS

| 6,081,566 A | 6/2000 | Molnar et al. |
| 6,347,125 B1 * | 2/2002 | Dent ..................... H03M 13/41 375/341 |

(Continued)

FOREIGN PATENT DOCUMENTS

| JP | 2012186806 | 9/2012 |
| JP | 2012186807 | 9/2012 |

OTHER PUBLICATIONS

Winter, M. et al; Cross-Polarization Modulation in Polarization-Division Multiplex Transmission; IEEE Photonics Technology Letters, IEEE Service Center, Piscataway, NJ, US; vol. 22, No. 8; Apr. 15, 2010; pp. 538-540; XP011303351; ISSN: 1041-1135.

(Continued)

*Primary Examiner* — David Payne
*Assistant Examiner* — Casey Kretzer
(74) *Attorney, Agent, or Firm* — Patti & Malvone Law Group, LLC (57) ABSTRACT

An apparatus, a method and a computer program for determining estimates is disclosed. The apparatus determines estimates for transmitted symbols from received symbols of an optical signal affected by cross-Polarization Modulation (XpolM). The apparatus groups two or more subsequent received symbols from the optical signal into a group of received symbols and estimates an optical channel based on the group of received symbols and a hypothesis on the transmitted symbols. The apparatus further determines a reliability measure for a combination of the group of received symbols, the channel estimate, and the hypothesis, and determines the estimates for the transmitted symbols based on reliability measures for multiple hypotheses on the transmitted symbols.

13 Claims, 7 Drawing Sheets

(51) Int. Cl.
*H04L 25/03* (2006.01)
*H04L 25/02* (2006.01)
*H04L 25/06* (2006.01)
*H04B 10/079* (2013.01)

(56) References Cited

U.S. PATENT DOCUMENTS

| | | | | |
|---|---|---|---|---|
| 6,570,910 | B1* | 5/2003 | Bottomley | H03M 13/39 375/148 |
| 2010/0329677 | A1* | 12/2010 | Kaneda | H04B 10/60 398/65 |
| 2011/0268168 | A1 | 11/2011 | Dybdal et al. | |
| 2012/0224852 | A1 | 9/2012 | Liu et al. | |

OTHER PUBLICATIONS

Noel, P. et al; The Design, Development and Implementation of a Cross-Polarization Interference Cancellation System for Point-to-Point Digital Microwave Radio Systems; Electrical and Computer Engineering (CCECE), 2011 24th Canadian Conference on, IEEE; May 8, 2011; pp. 1365-1369; XP031967746; DOI:10.1109/CCECE.2011.6030686; ISBN: 978-1-4244-9788-1.

Serena, P. et al.; A New Fast and Blind Cross-Polarization Modulation Digital Compensator; ECOC Technical Digest 2012; Sep. 2012; 2012 OSA; 3 pages.

* cited by examiner

APPARATUS, METHOD AND COMPUTER PROGRAM OPERABLE TO DETERMINE ESTIMATES

Embodiments of the present invention relate to data transmission and reception, more particularly but not exclusively to data estimation and data detection in an optical receiver.

BACKGROUND

Conventional communication systems mostly comprise a backbone part and an access part. For example, a wireless communication network may comprise a Radio Network Access (RAN) part, which establishes and controls the wireless access, and a Core Network (CN), through which other networks and other users of the wireless communication network are connected. Another example of a packet data or a packet switched communication network is the communication network established between the servers and routers of the World Wide Web (WWW). With the steady increases of data demand, interfaces and networks are improved to handle the increased load. For wired connections in the network, optical data transmission using fibers is used to enhance the link capacity between such interfaces.

In communication systems, such as systems using optical data transmission, wireless, wireline or powerline communications, digital data values may be transmitted by means of an optical transmission signal. The optical transmission signal is generated by modulating the phase and/or the amplitude of an optical carrier signal. For example a carrier frequency of the optical signal is changed in dependence on the transmitted data values and in accordance with a constellation diagram of a respective Phase-Shift Keying (PSK) modulation or Quadrature Amplitude Modulation (QAM) method. Prominent examples are Binary Phase Shift Keying (BPSK), Quaternary Phase Shift Keying (QPSK), 16 QAM, 64 QAM, etc.

Moreover, conventional concepts may use polarization multiplexing for data transmission, i.e. different polarization may be used to transmit different transmit symbols simultaneously. Optical fibers are used for transmitting optical signals. Non-linear effects may impose limits on the performance of optical communication systems. In particular, systems using Polarization Division Multiplexing (PDM) can be limited by cross-Polarization Modulation (XPolM). This effect can be predominant when the power of the transmit signal is close to the non-linear threshold, e.g. notably when using PDM-BPSK modulation over existing submarine cables based on Non-Zero Dispersion Shifted Fiber (NZ-DSF). The Signal-to-Noise-Ratio (SNR) and the Q-factor can thus suffer from large variations.

SUMMARY

It is a finding that data reception or data detection can be based on blind channel estimation and mean square error or maximum likelihood detection. Moreover, especially when XPolM is used for optical communication blind channel estimation can be based on a hypothesis on the transmitted symbols and a reliability measure can be determined on a combination of received symbols, the channel estimate and the hypothesis on the transmitted symbols. The reliability measure may represent a probability on whether said combination, especially the hypothesis and the channel estimate based thereon, correspond to the real values.

Embodiments provide an apparatus which is operable to determine estimates for transmitted symbols from received symbols of an optical signal affected by cross-polarization modulation (XPolM). For example, the optical signal can be impaired by XPolM. Cross-talk between differently modulated polarizations may be introduced in an optical channel. In other words, the optical signal may comprise cross-talk interference from the polarization channels used for polarization multiplexing. In embodiments the apparatus may be comprised or included in a receiver for the optical signal and the receiver or the apparatus may comprise further or additional components such as optical/electrical converters, chromatic dispersion estimation and/or compensation, a constant modulus entity for applying a constant modulus algorithm, carrier frequency and phase estimation, a decoder, a detector, one or more filters, etc. All of these components can be implemented using one or more according modules, devices or units.

The apparatus is operable to group two or more subsequent received symbols from the optical signal into a group of received symbols and to estimate an optical channel based on the group of received symbols and a hypothesis on the transmitted symbols. In other words the apparatus may comprise means for grouping multiple received symbols into a group or block of received symbols for which the channel is commonly estimated. That is to say the apparatus may comprise means for estimating the channel per group of received symbols. The means for grouping and the means for estimating can thus be coupled with each other. The apparatus is further operable to determine a reliability measure for a combination of the group of received symbols, the channel estimate, and the hypothesis. Hence, in some embodiments the reliability measure can be chosen as a likelihood ratio, a log-likelihood ratio, a mean square error, etc. Hence the apparatus can comprise means for determining the reliability measure. The means for determining can be coupled to the above described means.

Furthermore, the apparatus is operable to determine the estimates for the transmitted symbols based on reliability measures for multiple hypotheses on the transmitted symbols. In other words, the apparatus comprises further means for determining the estimates on the transmitted symbols, which can be operable to determine at least two different hypotheses on different combinations of transmitted symbols based on which at least two reliability measures are determined. The estimation on the transmitted symbols can be determined based on selecting the transmitted symbols from the most reliable combination of received symbols, channel estimate and hypothesis. The further means for determining can be coupled to the above described means.

Means as described herein may be implemented using one or more according devices, units, or modules, which can be operable to carry out the respective function or task of the means as described above. In some embodiments the means can be implemented as computer programs and one or more hardware components operable to execute said computer programs, such as one or more Digital Signal Processors (DSP), multi-purpose processors, etc.

In embodiments a transmission of transmit symbols can be organized in repetitive symbol intervals. Such symbol intervals can also be referred to as slots, frames, transmission intervals, etc. Two transmit symbols can be transmitted per symbol interval using different polarizations of the optical signal, such as horizontal and vertical polarizations. The apparatus can be operable to receive two received symbols per symbol interval. That is to say that the apparatus comprises means for receiving said received symbols. The means for receiving can be implemented as a receiver comprising typical receiver components, such as an optical/electrical converter, filter, amplifiers, mixer, one of the above components, etc. Hence, the apparatus can be operable to receive an optical receive signal, to convert the optical receive signal to an electrical receive signal, and to determine the received symbols from the electrical receive signal.

The apparatus, the means for grouping, respectively, can be operable to group received symbols of two or more symbol intervals into the group of received symbols. In other words there can be two received symbols per symbol interval, which can be received from different polarizations. The apparatus, the means for estimating, respectively, can be operable to estimate the optical channel jointly for all received symbols in the group. The channel may then be considered as being a common channel for the symbols in the group.

In other words, the apparatus and/or the means for grouping can be operable to group received symbols from symbol intervals corresponding to a time period, which is shorter than a coherence time of the optical channel, into the group of received symbols. That is to say the group of received symbols comprises received symbols from a time interval, which is short enough for the channel not to change significantly. Hence, the assumption of a constant channel can be applied per group of received symbols.

Embodiments may make use of a concept for mitigating the XpolM at the receiver side. It can be based on a two-step approach. Firstly, it may relax the XPolM problem, and secondly, it may solve the relaxed problem with a joint blind channel estimation and data detection concept. The joint channel estimate and data detection in embodiments can be based on the generalized maximum likelihood theory. Embodiments may process a received sequence operating on blocks of symbols. For each block, first an optimization may be performed over the unknown channel matrix, whose particular form is given by the relaxed XpolM problem, and then a minimum distance over the set of all possible transmitted blocks can be computed. That is to say the reliability measure can be based on a difference or a deviation between the received symbols and a combination of the estimate of the optical channel and the hypothesis on the transmitted symbols. In simple words, estimated received symbols may be determined based on the hypothesis and the channel estimation. The difference between the estimated received symbols and the actual received symbols may serve as a basis for the reliability measure, e.g. the magnitude or the square of the difference may be evaluated. Hence, in some embodiments the reliability measure corresponds to a squared difference or deviation between the received symbols and estimated received symbols, the estimated received symbols correspond to the product of the hypothesis on the transmitted symbols and the channel estimate.

In further embodiments the apparatus can be operable to iteratively determine different reliability measures for all possible hypotheses for the subsequent symbol intervals in the group of received symbols and for basing a subsequent estimation on the hypothesis for the respective symbol interval, which indicates the highest reliability. In other words the apparatus may be operable to further preclude certain sub-branches subsequently and therewith narrow the scope of the search, such that it becomes computationally feasible. For example, the optical receive signal can be a PDM binary phase-shift keying signal. Hence, the symbol alphabet for the transmit symbols comprises two possibilities, two of which are transmitted at a time multiplexed using different polarizations. Altogether this may result in four combinations per symbol interval. Obviously, the scope of the search depends on the size of the group of received symbols and/or the time period the group represents and the order of the modulation used.

As an exhaustive search or iteration can be computationally very complex, the apparatus may narrow down the search in some other embodiments. For example, the apparatus can be operable to determine different reliability measures for all possible hypotheses for a first symbol interval. The group of received symbols may represent multiple subsequent symbols intervals as described above. The apparatus may, at first, only consider the first symbol from the interval and it may base a subsequent estimation on the hypothesis for the first symbol interval, which indicates the highest reliability. That is to say symbols, which indicate low reliability may not be considered subsequently, which may eliminate branches of subsequent combinations. From another perspective the apparatus may be operable to consider the first symbols as the roots for different combinations and it may consider the reliability measures for said root first and it may then eliminate one or more roots from the subsequent search or iteration.

In further embodiments the apparatus can be operable to iteratively determine different reliability measures for all possible hypotheses for the subsequent symbol intervals in the group of received symbols and for basing a subsequent estimation on the hypothesis for the respective symbol interval, which indicates the highest reliability. In other words the apparatus may be operable to further preclude certain sub-branches subsequently and therewith narrow the scope of the search, such that it becomes computationally feasible. For example, the optical receive signal can be a pulse-duration-modulated binary phase-shift keying signal. Hence, the symbol alphabet for the transmit symbols comprises two possibilities, two of which are transmitted at a time multiplexed using different polarizations. Altogether this may result in four combinations per symbol interval. Obviously, the scope of the search depends on the size of the group of received symbols and/or the time period the group represents and the order of the modulation used.

Embodiments further provide a method for determining estimates for transmitted symbols from received symbols of an optical signal affected by XpolM. The method comprises grouping two or more subsequent received symbols from the optical signal into a group of received symbols. The method further comprises estimating an optical channel based on the group of received symbols and a hypothesis on the transmitted symbols and determining a reliability measure for a combination of the group of received symbols, the channel estimate, and the hypothesis. The method further comprises determining the estimates for the transmitted symbols based on reliability measures for multiple hypotheses on the transmitted symbols.

Moreover, embodiments provide a computer program having a program code for performing one of the above-described methods, when the computer program is executed on a computer or a processor.

Embodiments may provide the advantage that an efficiency as compared to existing data estimators may be improved. Moreover, embodiments may provide a scalable concept in terms of complexity depending on the number of received symbols in a group, in the following also referred to as block length P. Embodiments may further provide the advantage that a blind channel estimation concept may be enabled, such that no transmission resources have to be used for reference signals, which may even further increase the efficiency of an optical transmission system.

BRIEF DESCRIPTION OF THE FIGURES

Some other features or aspects will be described using the following non-limiting embodiments of apparatuses and/or methods and/or computer programs by way of example only, and with reference to the accompanying Figures, in which.

DETAILED DESCRIPTION

Various embodiments will now be described in more detail with reference to the accompanying drawings. In the figures, the thicknesses of lines, layers and/or regions may be exaggerated for clarity.

Accordingly, while embodiments are capable of various modifications and alternative forms, embodiments thereof are shown by way of example in the figures and will herein be described in detail. It should be understood, however, that there is no intent to limit embodiments to the particular forms disclosed, but on the contrary, embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description some components will be displayed in multiple figures carrying the same reference signs, but may not be described multiple times in detail. A detailed description of a component may then apply to that component for all its occurrences.

Figure 1:
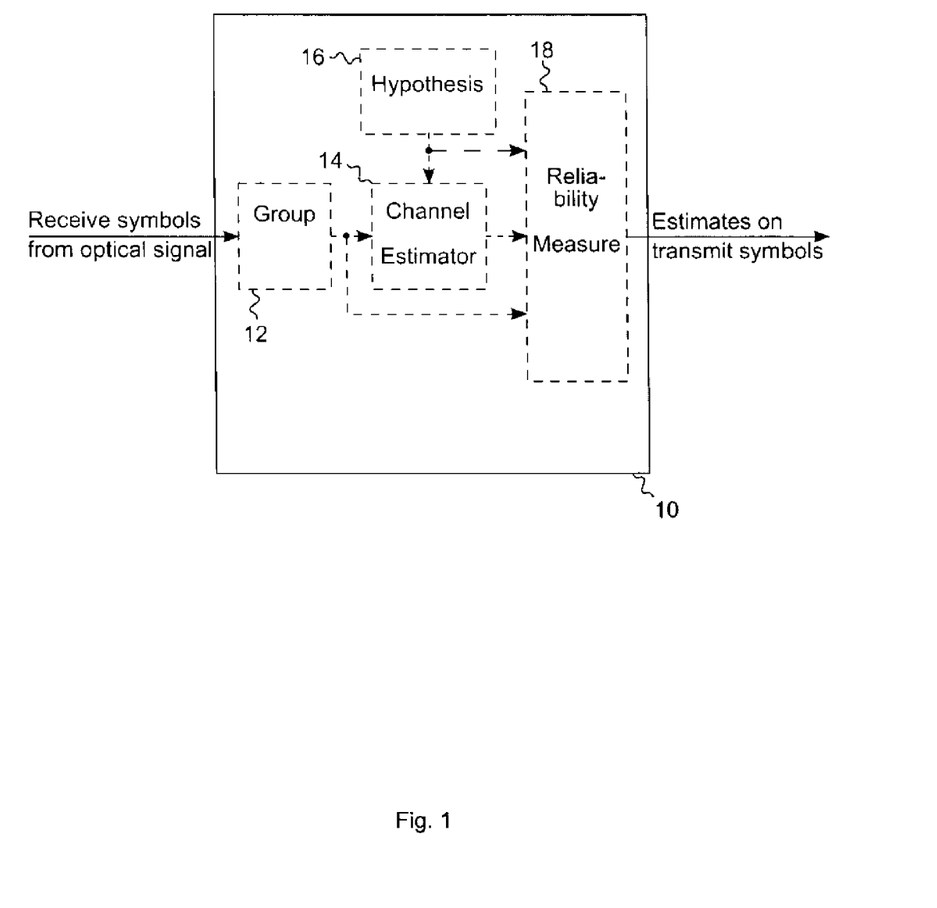
FIG. 1 illustrates an embodiment of an apparatus operable to determine estimates for transmitted symbols.

In the following figures optional components are shown in dashed lines. FIG. 1 shows an embodiment of an apparatus 10, which is operable to determine estimates for transmitted symbols from received symbols of an optical signal affected by XpolM. The apparatus 10 is operable to group two or more subsequent received symbols from the optical signal into a group of received symbols. In some embodiments this can be achieved using means for grouping 12, which is shown to be optional in FIG. 1. The apparatus 10 is further operable to estimate an optical channel based on the group of received symbols. In some embodiments this can be achieved by using a channel estimator 14. Moreover, the apparatus is operable to further determine a hypothesis on the transmitted symbols, which can be achieved using a hypothesis determiner 16 in some embodiments. Furthermore, the apparatus 10 is operable to determine a reliability measure for a combination of the group of received symbols, the channel estimate, and the hypothesis. This can in some embodiments be achieved using a reliability measure determiner 18. The apparatus 10 is further operable to determine the estimates for the transmitted symbols based on reliability measures for multiple hypotheses on the transmitted symbols.

Figure 2:
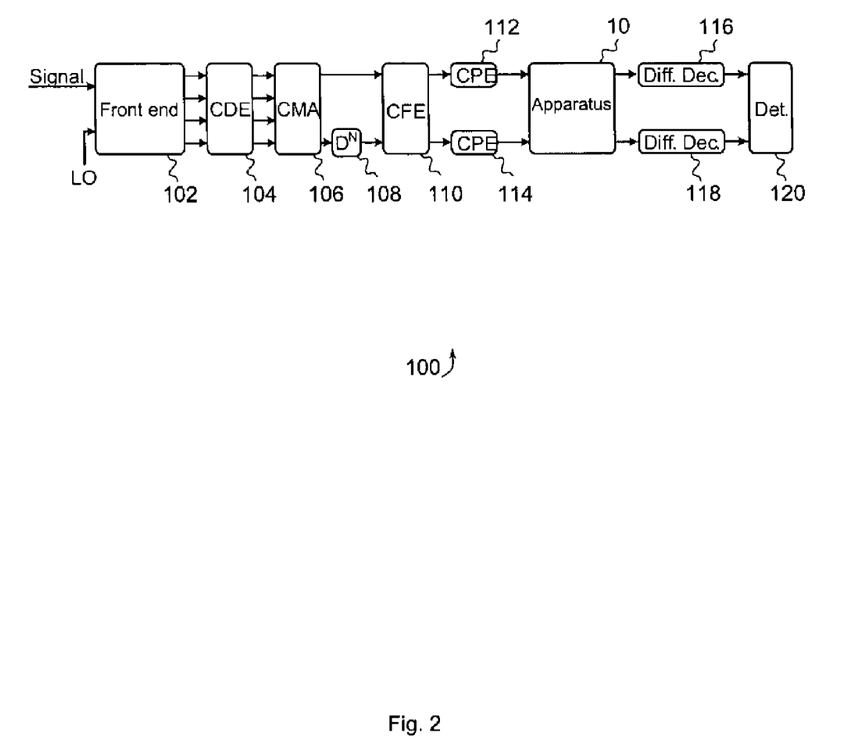
FIG. 2 shows a block diagram of a receiver comprising an embodiment.

FIG. 2 shows a receiver structure 100 with an embodiment of the apparatus 10. The receiver structure comprises a front end 102, which receives the optical signal and a signal from a Local Oscillator (LO). The front end 102 converts the optical signal to an electrical signal and downmixes the respective signal from the transmission band to the base band. The signal may as well be converted to complex-valued samples in the base band. The front end 102 is then followed by a Chromatic Dispersion Estimation 104 (CDE) and compensation. Afterwards a Constant Modulus Algorithm 106 (CMA) is applied to carry out blind de-convolution in terms of equalization. In FIG. 2 the lower branch of the signal processing chain comprises a Delay (D) unit 108, which delays the symbols in said branch by N symbols, symbol times or intervals respectively. The remaining two branches are then input into a Carrier Frequency Estimation 110 (CFE) and subsequently into two separate Carrier Phase Estimation (CPE) blocks 112 and 114. The result is then input into the apparatus 10 as received symbols for the different polarizations. The estimates of the transmitted symbols determined by the apparatus 10 are the provided to two differential decoders 116 and 118 before being detected by detector 120.

Embodiments may mitigate the XpolM effect at the receiver 100 side through signal processing. In a standard coherent receiver 100, embodiments may be located after the CFE/CPE blocks 110, 112, 114 as shown in FIG. 2. In other embodiments, one or more of the components shown in FIG. 2 may be comprised in the apparatus 10. In other words the apparatus 10 can be operable to receive an optical receive signal, to convert the optical receive signal to an electrical receive signal, and to determine the received symbols from the electrical receive signal.

In the following details of an embodiment will be provided. It is first assumed that the system-level XpolM can be described with $N_{Rx}$: the number of received polarizations/modes, i.e. $N_{Rx}=2$ in a Single Mode Fiber (SMF) fiber;

$N_{Tx}$: the number of transmit polarizations/modes, i.e. $N_{Tx}=2$ in an SMF fiber;

H: the XpolM channel transfer matrix (of size $N_{Rx} \times N_{Tx}$) capturing the multichannel components of the XpolM;

x: the transmitted symbols vector (of size $N_{Tx} \times 1$);

y: the received symbols vector (of size $N_{Rx} \times 1$); and n: the Additive White Gaussian Noise (AWGN) vector (of size $N_{Rx} \times 1$) modeling the Amplified Spontaneous Emission (ASE).

Hence, transmission of transmit symbols is organized in repetitive symbol intervals and two transmit symbols are transmitted per symbol interval using different polarizations of the optical signal. The apparatus 10 is operable to receive two receive symbols per symbol interval and to group received symbols of two or more symbol intervals into the group of received symbols.

The received symbol at time k, sampled at the symbol-rate, can be expressed as $$y_k = H_k x_k + n_k \quad (1)$$
$$= \begin{bmatrix} \sqrt{1-|\alpha_k|^2} & -\alpha_k^* \\ \alpha_k & \sqrt{1-|\alpha_k|^2} \end{bmatrix} x_k + n_k$$
$$\approx \begin{bmatrix} 1 & -\alpha_k^* \\ \alpha_k & 1 \end{bmatrix} x_k + n_k$$

for each discrete time index k. Note that this model assumes that all linear effects are perfectly compensated and other inter- and intra-channel non-linear impairments are neglected. More details on the behavior of $\alpha_k$ can be found in A. Ghazisaeidi, et al., "Performance Analysis of Decision-Aided Nonlinear Cross-Polarization Mitigation Algorithm", ECOC2012. The apparatus 10 is operable to estimate the optical channel H jointly for all received symbols y in the group, which is assumed to comprise received symbols from P subsequent symbols intervals. The apparatus 10 is operable to group received symbols from symbol intervals corresponding to a time period, which is less than a coherence time of the optical channel, into the group of received symbols. The typical coherence time of the XPolM process is between 10 to 20 symbols.

In the following embodiment the problem in (1) is relaxed as it is assumed that the channel H is quasi-static over P symbols of time. This is justified when P is relatively small compared to the coherence time. The problem in (1) can then be reformulated as:

$$Y = H'X + N \quad (2)$$

where Y is the received symbol matrix, to which it is also referred to as group of received symbols, stacking P symbols, i.e. $Y=[y_k \; y_{k+1} \ldots y_{k+P-1}]$, X is the transmitted symbol matrix of size $N_{Tx} \times P$, N is the noise matrix of size $N_{Rx} \times P$ and H' is the relaxed channel matrix of size $N_{Rx} \times N_{Tx}$. Note that H' is unknown at the receiver side and it is to be estimated blindly in the second step of the embodiment detailed hereafter.

In the following an XPolM mitigation algorithm of an embodiment will be described. This second step performs a joint channel estimation and data detection. The optimal solution under these assumptions can be given by the Generalized Maximum Likelihood expressed as $$X^{opt}, H'^{opt} = \arg\min_{X, H'} \|Y - H'X\|^2. \quad (3)$$

It can be solved sequentially by firstly minimizing over H', and secondly over X. Some more notations need to be introduced. For any matrix A: $A_{(i)}$ denotes the first i columns of A, $a_i$ denotes the $i^{th}$ column of A, e.g. $A=[a_1 \; a_2 \ldots a_P]$ and $A_{(2)}=[a_1 \; a_2]$, and $a_{i,j}$ denotes the (i,j) entry of matrix A. The channel estimate for any given transmitted matrix X of length P can be written as:

$$H' \approx \begin{bmatrix} 1 & -\alpha^* \\ \alpha & 1 \end{bmatrix} \quad (4)$$

and $$\alpha = \frac{1}{2P}\left(\sum_{k=1}^{P} \frac{y_{2,k} - x_{2,k}}{x_{1,k}} - \frac{y_{1,k}^* - x_k^*}{x_{2,k}^*}\right).$$

Obviously, brute force search is hardly manageable for $P \geq 4$ and high-order modulation (e.g. 16QAM). However, some progress has been made recently and proposed to solve the GML problems with a branch-estimate-bound framework, cf. Weiyu X U, et al., "ON EXACT MAXIMUM-LIKELIHOOD DETECTION FOR NON-COHERENT MIMO WIRELESS SYSTEMS: A BRANCH-ESTIMATE-BOUND OPTIMIZATION FRAMEWORK", ISIT2008, pp. 2017-2021.

The following embodiment considers a branch-estimate-bound framework and uses partial metrics. These partial metrics up to the time index i can be written as:

$$M(i) = \min_{H'} \|Y(i) - H'X(i)\|^2, \quad (5)$$

where H' is calculated as per (4) with P replaced by the length of X(i), which is $i \leq P$.

Let R be the optimum distance. It can be demonstrated that if any partial metric M(i) is larger than the optimum distance R, then the global optimum solution cannot be the candidate sequence X(i) associated to the partial metric M(i), which serves as reliability measure in the present embodiment. In other words, in this embodiment the reliability measure M(i) is based on the difference between the received symbols Y(i) and a combination H'X(i) of the estimate H' of the optical channel H and the hypotheses X(i) on the transmitted symbols. In particular, the reliability measure M(i) corresponds to a squared difference $\|Y(i) - H'X(i)\|^2$ between the received symbols Y(i) and estimated received symbols H'X(i), the estimated received symbols H'X(i) correspond to the product of the hypothesis X(i) on the transmitted symbols and the channel estimate H'.

In some embodiments, partial candidate solutions can be removed from the search of the optimum solution (with their offsprings), when any partial metric M(i) is larger than the optimum distance R, since the global optimum solution cannot be the candidate sequence X(i) associated to that partial metric M(i). The complexity of the overall search may therewith be reduced significantly.

In other words, the apparatus 10 can be operable to iterate through different reliability measures based on different hypotheses of transmitted symbols X and different channel estimates H'. Note that in line with the above equation (4) the channel estimate depends on the hypothesis. Hence, the apparatus 10 can be operable to determine different estimates of the optical channel for the different hypotheses.

The apparatus 10 is further operable to determine the estimates of the transmitted symbols based on a hypothesis on the transmitted symbols yielding a reliability measure with highest reliability, in the present embodiment the highest reliability may correspond to the lowest partial metric M(i), which may correspond to the optimum distance or which may be the closest to the optimum distance. In some embodiments the apparatus 10 can be operable to iterate through all possible hypotheses on transmitted symbols in a given group of received symbols. In other embodiments, the search may be limited based on the partial metrics or reliability measures of certain symbols.

In some embodiments, the apparatus 10 is further operable to determine different reliability measures for all possible hypotheses for a first symbol interval and for basing a subsequent estimation on the hypothesis for the first symbol interval, which indicates the highest reliability. In other words, the apparatus 10 may preclude certain combinations after having determined certain partial metrics, which are higher than the optimal distance. Principally, this may be carried out at any stage of the processing. However, at least in some embodiments the number of combinations, which can be precluded from the search may depend on how early certain combinations could be precluded. In other words, the earlier such a preclusion can be determined, the higher the reduction in complexity.

The apparatus 10 may then be operable to iteratively determine different reliability measures for all possible hypotheses for subsequent symbol intervals in the group of received symbols and for basing a subsequent estimation on the hypothesis for the respective symbol interval, which indicates the highest reliability.

In the following the choice of the initial radius will be described for an embodiment. The initial radius depends on the statistics of the AWGN noise $(1/\sigma^2) \cdot \|N\|^2$, which is chi-square distributed with $2N_{Rx} \cdot P$ degrees of freedom. A good initial radius is such that a candidate partial sequence is found with a sufficiently high probability $Pr(\|N\|^2 \leq R^2) = x$ %, where x can be defined, e.g. as 50, 75, 90, 95, 99, etc. If no point or combination is found with the initial radius, then the XpolM mitigation algorithm increases the radius to find a solution. $R^2 = 2 \cdot N_{Rx} \cdot P \cdot \sigma^2$ as the initial radius is a good compromise. However, it is worth mentioning that the algorithm may always converge, whatever the choice of the initial radius; but a too large R will take more time to find the optimum solution.

Figure 3:
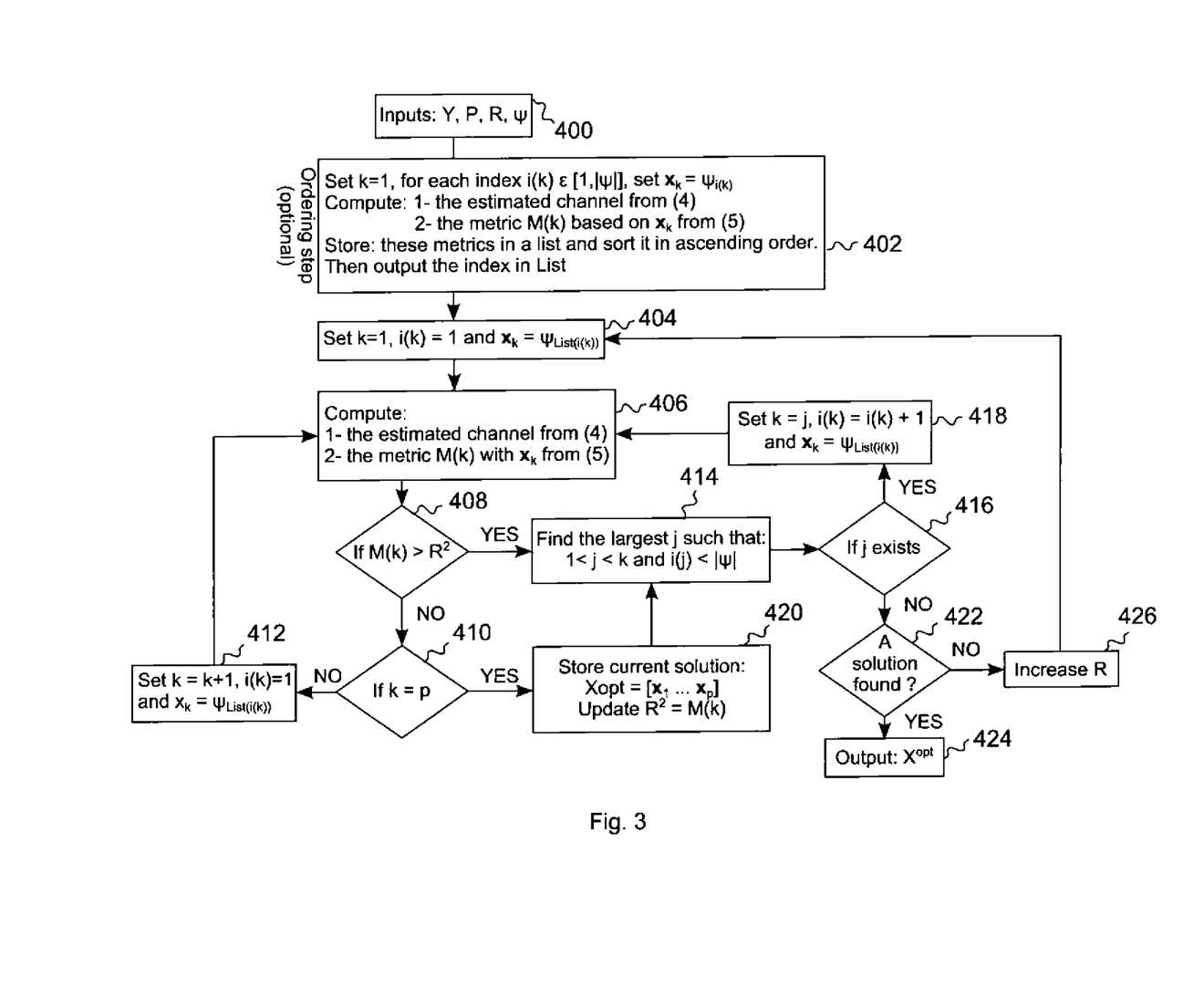
FIG. 3 shows a block diagram of an embodiment of a method.

In the following a possible implementation will be described for an embodiment. A possible implementation of the XPolM mitigation algorithm is shown in the flow chart in FIG. 3. FIG. 3 illustrates a block diagram of an embodiment of a method for determining estimates of transmitted symbols. As FIG. 3 shows in block 400, input values into the method are the received symbols Y, the block or group size P, the initial Radius R and the constellation $\Psi$. The constellation $\Psi$ is a set representing the different combinations of the constellation points of the transmit symbols from the $N_{Tx}$ transmitter polarizations/modes $\Psi = \{\psi_1, \psi_2, \ldots \psi_{|\Psi|}\}$ and $|\Psi|$ denotes the cardinality of this set. For instance, in a PDM-BPSK system, the set $\Psi$ is $$\left\{ \begin{bmatrix} +1 \\ +1 \end{bmatrix}, \begin{bmatrix} +1 \\ -1 \end{bmatrix}, \begin{bmatrix} -1 \\ -1 \end{bmatrix}, \begin{bmatrix} -1 \\ +1 \end{bmatrix} \right\},$$

where $$\begin{bmatrix} +1 \\ +1 \end{bmatrix}$$

are the symbols transmitted on the 2 polarizations and $|\Psi| = 2^{N_{Tx}M}$, where M is the number of bits/symbol. Hence, in the present embodiment the optical receive signal is a PDM binary phase-shift keying signal.

Note that in the present embodiment, there are two main variables representing indices, i.e. the variable $k \in [1, P]$ denoting the depth level of the algorithm and the variable $i(k) \in [1, |\Psi|]$ depending on the index k, and denoting the $i^{th}$ tested candidate $\Psi_i$ for the $k^{th}$ column of X, i.e. the hypotheses. In step 402 of FIG. 3 initialization for the algorithm is carried out, i.e. k=1 for each index $i(k) \in [1, |\Psi|]$, $x_k = \Psi_{i(k)}$. Moreover the estimated channel is computed in line with the above equation (4) and the metric M(k) is computed based on $x_k$ and equation (5). These metrics can be stored in a list and sorted in ascending order. The output indexes can be stored in a variable list.

Figure 4:
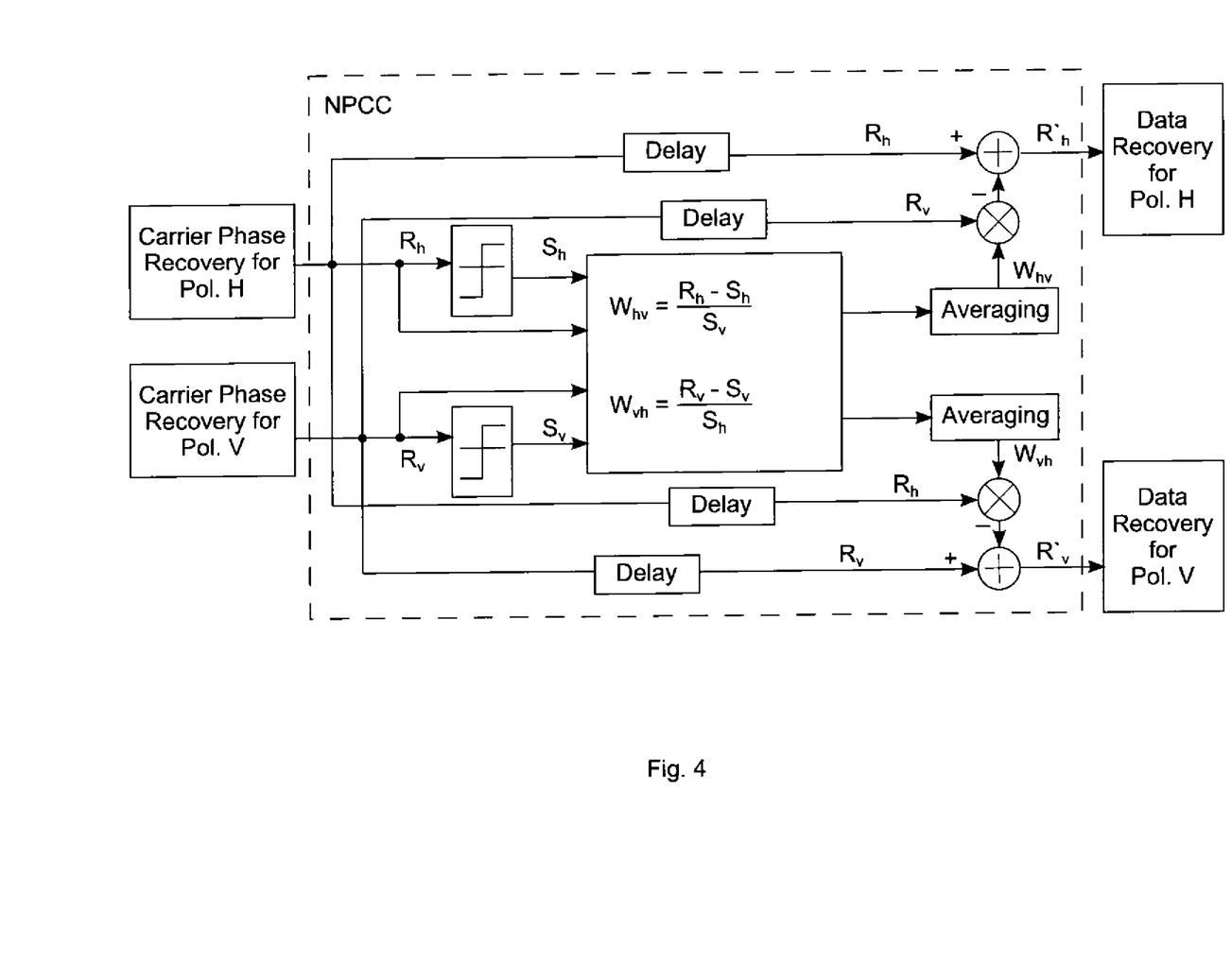
FIG. 4 depicts a decision aided XPolM algorithm.

In step 404 of FIG. 4 an iteration starts with k=1, i(k)=1 and $x_k = \Psi_{list(i(k))}$. It is to be noted that the iteration may therewith be started with the hypothesis yielding the lowest metric from the sorted list. In step 406 the estimated channel is computed according to equation (4) and the metric M(k) is computed in line with equation (5) and $x_k$ from step 404. In step 408 a comparison of the metric M(k) with $R^2$ is carried out. If $M(k) \leq R^2$ in step 410 it is checked whether k=P, i.e. whether all hypotheses across the group of 2P received symbols have already been considered. If not, i.e. if k<P, then in step 412 k=k+1, i(k)=1 and $x_k = \Psi_{list(i(k))}$. The next iteration loop the starts at step 406 with the correspondingly increased k.

If in the comparison step 408 it is found that $M(k) > R^2$ hence, that the partial metric is larger than the optimum value, then in step 414 it is determined whether an integer j exists with $1 \leq j \leq k$, i.e. within the positions in the group of received symbols which have already been considered and with $i(j) < |\Psi|$, i.e. without reaching the limit of the symbol alphabet for the hypothesis. In step 416 it is then checked whether such integer j exists. If it does exist, then in step 418 k=j, i(k)=i(k)+1 and $X_k = \Psi_{list(i(k))}$, i.e. the next hypothesis is considered starting a new iteration loop in step 406.

In other words, the loop shown on the left hand side in FIG. 3 (steps 406, 408, 410, 412, back to 406) iterates through the time index k making sure that all positions in the block are considered. If at a certain position it is found that $M(k) \leq R^2$ then the loop on the right hand side of FIG. 3 (steps 408, 414, 416, 418, 406, back to 408) assures that all possible hypothesis are considered at that position. If in step 410 k=P is reached, i.e. all positions within the block have been considered and for each position an $M(k) \leq R^2$ has been found, the current solution is stored in step 420 as $X^{opt} = [x_1, x_2, \ldots, x_P]$ and the distance is updated as $R^2 = M(k)$. From there the algorithm continues in step 414, i.e. it is checked whether other combinations for checking are available, i.e. whether another according integer j can be found. If in the subsequent step 416 it turns out that no such integer j can be found, i.e. all combinations have been considered up to this point, in step 422 it is verified if a solution has been found at all. If a solution has been stored, cf. step 420, then the solution $X^{opt}$ is output in step 424. If no solution has been found in step 422 the distance R is increased in step 426, since this may occur when R is set so small that in step 408 all metrics M(k) fulfill the condition and step 410 has never been reached. Increasing R in step 426 ensures that R will reach a value, which will eventually satisfy $M(k) \leq R^2$ in step 408.

In order to speed up the convergence of the embodiment, an ordering step can be introduced. This ensures that the algorithm begins with potential candidates with the smallest partial metrics at the first level (i.e. when k=1). Intuitively, it can be expected that a small partial metric at the first level has a higher likelihood to lie within the square radius distance $R^2$ at the level P (i.e. when k=P). Hence, it could be stored as a current solution, and the new distance $R^2$ would be reduced (if necessary). The ordering step makes use of an ordered set of indexed called List in FIG. 3. Obviously, if the ordering step is skipped, then List is just a list of indexes from 1 to |Ψ| in the ascending order.

In the following simulation results will be presented comparing the above embodiment to two other approaches. The following receiver side signal-processing-based techniques are considered for comparison. A decision-aided XPolM algorithm, introduced by Lei Li, et al, "Nonlinear Polarization Crosstalk Canceller for Dual-Polarization Digital Coherent Receivers", OFC2010, is depicted in FIG. 4, which provides poor performance improvement, since the processing is based on hard decision of the received symbols sequences. The approach shown in FIG. 4 makes use of threshold decisions and averaged crosstalk compensation based on said decisions. It is therefore referred to as a Nonlinear Polarization Crosstalk Canceller (NPCC).

Figure 5:
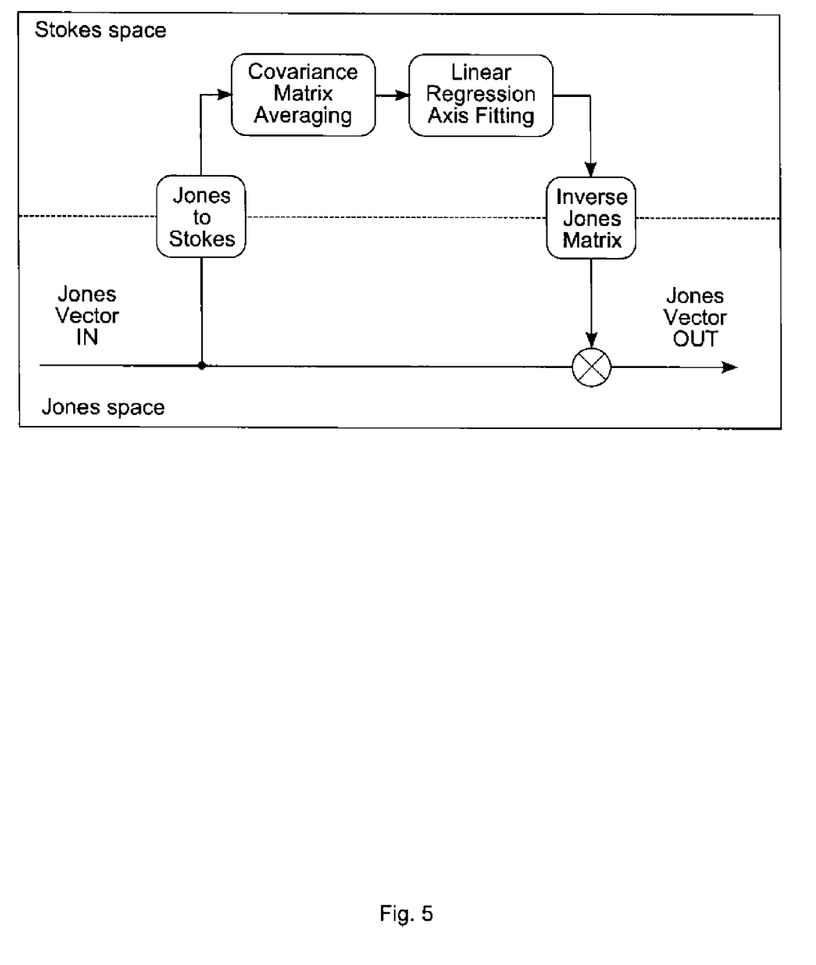
FIG. 5 shows a block diagram of a blind XPolM algorithm.

The second approach is a blind XPolM algorithm and it makes use of covariance matrix averaging and linear regression axis fitting in the Stokes space, using conversion from the Jones space to Stokes space and back to the Jones space. A principal block diagram is depicted in FIG. 5. The concepts provides a larger performance improvement compared to the first approach shown in FIG. 4. However, the $Q^2$-factor, as a quality measure, is still limited as shown in FIG. 6.

Figure 6:
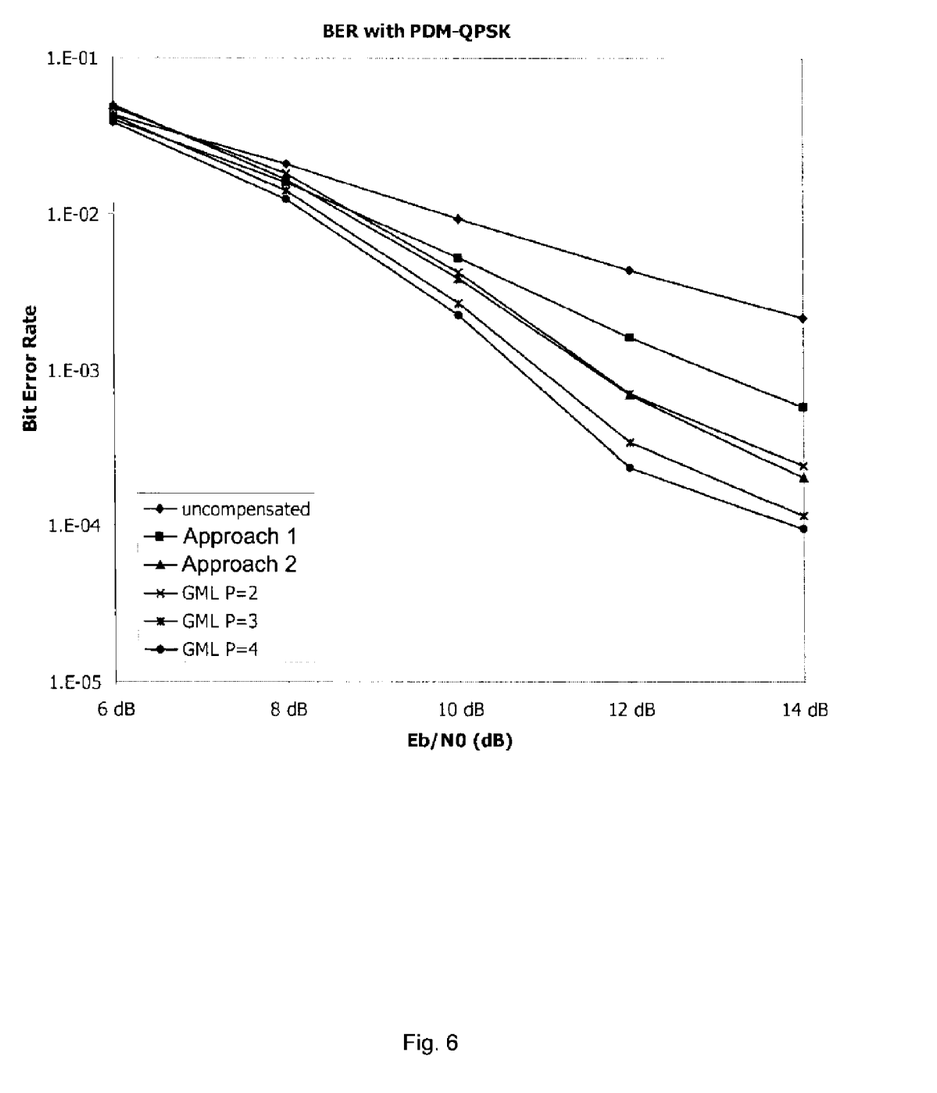
FIG. 6 illustrates simulation results of bit error rates versus bit energy per noise density.

FIG. 6 illustrates the simulation results by means of Bit Error Rates (BER) versus bit energy $E_b$ per noise density No. For illustration purposes, the numerical simulations have been performed with a semi-analytical model also shown in A. Ghazisaeidi, et al. In the simulated example the XPolM strength was set to 0.06, which is a typical value in experimental settings. The plot in FIG. 6 shows different curves representative of:
  the uncompensated case, i.e. when XPolM is not post-compensated at the receiver side;
  the first approach in line with Lei Li et al, where the decision-aided algorithm was applied at the receiver side to mitigate XpolM;
  the second approach in line with P. Serena et al, where the blind-XPolE algorithm from Bell Labs was applied at the RX side to mitigate XpolM;
  the invention GML-based algorithm for various values of P=2, 3, or 4.

From FIG. 6 it can be seen that the proposed invention with P=2, performance is very close to the previously introduced blind-XPolE algorithm, cf. the second approach. However, when the value of P increases, the performance also improves. With P=3 (respectively P=4), the gap with respect to the best existing solution is ~0.7 dB (resp. 1 dB) at the BER $10^{-3}$. In further embodiments a threshold value may be implemented to (de-) activate the algorithm. In other words, in some embodiments the iteration may be terminated once a certain threshold for the distance R has been reached.

Some embodiments may estimate the XPolM strength. The variance of the XpolM can be monitored and estimated at the receiver side. Then, a threshold value (configurable at Operation and Maintenance (OAM) for instance) may be implemented and if the monitored XPolM strength exceeds the defined threshold, some embodiments may activate the main XpolM mitigation algorithm; otherwise, it may remain deactivated.

Additionally, a parameter β can be introduced to optimize the performances of the mitigation algorithm in some embodiments, when the XPolM strength is relatively low. β is a scaling factor, which can be used during the blind channel estimation step in some embodiments, where it can offset the value of α in (4), i.e. $\alpha^{(new)}=\alpha/\beta$. In some embodiments it may be optimized through Monte Carlo simulations and it may be a function of the block length P and the XpoIM strength. In some practical implementation of an embodiment, the optimal values of β can be computed offline for a set of parameters (P, XpolM strength) and can be stored in a look-up table.

Figure 7:
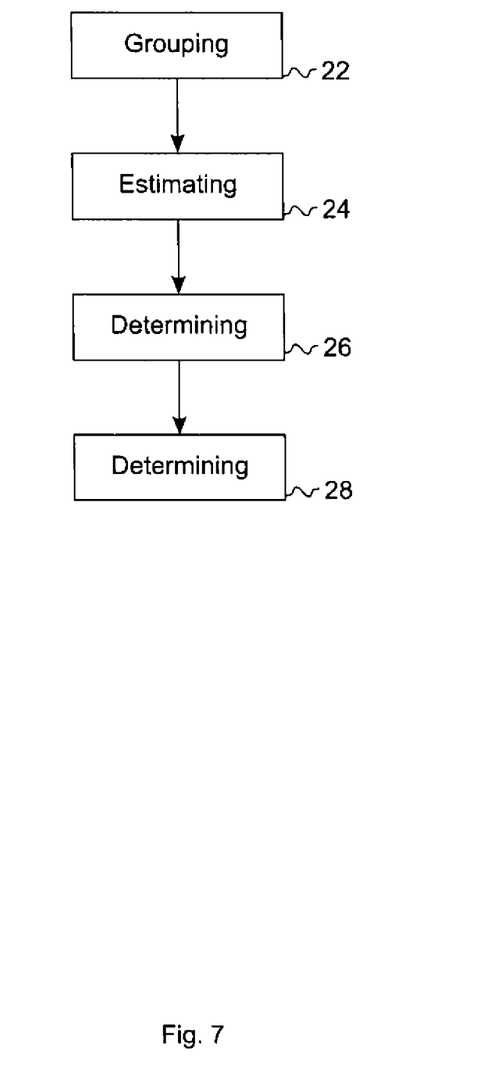
FIG. 7 shows a block diagram of an embodiment of a method.

FIG. 7 illustrates a block diagram of an embodiment of a method for determining estimates for transmitted symbols from received symbols of an optical signal affected by XpolM. The method comprises a step of grouping 22 two or more subsequent received symbols from the optical signal into a group of received symbols. The method comprises a further step of estimating 24 an optical channel based on the group of received symbols and a hypothesis on the transmitted symbols. The method comprises the further steps of determining 26 a reliability measure for a combination of the group of received symbols, the channel estimate, and the hypothesis and determining 28 the estimates for the transmitted symbols based on reliability measures for multiple hypotheses on the transmitted symbols.

Embodiments may provide the advantage that the decoding efficiency compared to the existing solutions may be increased. Moreover, embodiments may provide scalability in terms of complexity depending on the block length P. Embodiments may provide the further advantage that they are independent from a modulation format and that they may enable blind channel estimation. Embodiments may provide ~0.5 to 1 dB improvement in coherent receivers for typical XPolM strength and BER target, which allows the system to be more resilient to XPolM effects.

Further embodiments provide a computer program having a program code for performing one of the above methods when the computer program is executed on a computer or processor.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for grouping", "means for estimating", "means for determining", etc., may be provided through the use of dedicated hardware, such as "a grouper", "an estimator", "a determiner", etc. as well as hardware capable of executing software in association with appropriate software. Moreover, any entity described herein as "means", "means for" may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus operable to determine estimates for transmitted symbols from received symbols of an optical signal affected by cross-polarization Modulation, XpolM, the apparatus comprising:
 a grouping module operable to group two or more subsequent received symbols from the optical signal into a group of received symbols;
 an estimation module operable to estimate an optical channel based on the group of received symbols and a hypothesis on the transmitted symbols;
 a determination module operable to determine a reliability measure for a combination of the group of received symbols, the channel estimate, and the hypothesis, and further operable to determine the estimates for the transmitted symbols based on reliability measures for multiple hypotheses on the transmitted symbols;
 wherein a transmission of transmit symbols is organized in repetitive symbol intervals and wherein two transmit symbols are transmitted per symbol interval using different polarizations of the optical signal, and wherein the apparatus is operable to receive two received symbols per symbol interval and the grouping module is operable to group received symbols of two or more symbol intervals into the group of received symbols; and
 wherein the grouping module is operable to group received symbols from symbol intervals corresponding to a time period, which is less than a coherence time of the optical channel, into the group of received symbols.

2. The apparatus of claim 1, wherein the estimation module is operable to estimate the optical channel jointly for all received symbols in the group of received symbols grouped by the grouping module.

3. The apparatus of claim 1, wherein the reliability measure of the determination module is based on a difference between the received symbols and a combination of the estimate of the optical channel and the hypotheses on the transmitted symbols.

4. The apparatus of claim 1, wherein the reliability measure of the determination module corresponds to a squared difference between the received symbols and estimated received symbols, the estimated received symbols corresponding to the product of the hypothesis on the transmitted symbols and the channel estimate.

5. The apparatus of claim 1, wherein the estimation module is operable to iterate through different reliability measures from said determination module based on different hypotheses of transmitted symbols and different channel estimates and to determine the estimates of the transmitted symbols based on a hypothesis on the transmitted symbols yielding a reliability measure with highest reliability.

6. The apparatus of claim 5, wherein the estimation module is operable to iterate through all possible hypotheses on transmitted symbols in a given group of received symbols.

7. The apparatus of claim 6, wherein the estimation module is operable to determine different estimates of the optical channel for the different hypotheses.

8. The apparatus of claim 1, wherein the determination module is operable to determine different reliability measures for all possible hypotheses for a first symbol interval and for basing the estimation module is operable to base a subsequent estimation on the hypothesis for the first symbol interval, which indicates the highest reliability.

9. The apparatus of claim 8, wherein the determination module is further operable to iteratively determine different reliability measures for all possible hypotheses for the subsequent symbol intervals in the group of received symbols and the estimation module is operable to base a subsequent estimation on the hypothesis for the respective symbol interval, which indicates the highest reliability.

10. The apparatus of claim 1, further being operable to receive an optical receive signal, wherein the optical receive signal is a polarization-division-multiplexing binary phase-shift keying signal.

11. The apparatus of claim 1, further being operable to receive an optical receive signal, to convert the optical receive signal to an electrical receive signal, and to determine the received symbols from the electrical receive signal.

12. A method for determining estimates for transmitted symbols from received symbols of an optical signal affected by cross-polarization Modulation, XpolM, wherein a transmission of transmitted symbols is organized in repetitive symbol intervals, wherein two transmit symbols are transmitted per symbol interval using different polarizations of the optical signal, wherein two received symbols are received per symbol interval, the method comprising:

grouping two or more subsequent received symbols from the optical signal into a group of received symbols;

said grouping step including grouping received symbols of two or more symbol intervals into the group of received symbols, and grouping received symbols from symbol intervals corresponding to a time period, which is less than a coherence time of the optical channel, into the group of received symbols;

estimating an optical channel based on the group of received symbols and a hypothesis on the transmitted symbols;

determining a reliability measure for a combination of the group of received symbols, the channel estimate, and the hypothesis; and determining the estimates for the transmitted symbols based on reliability measures for multiple hypotheses on the transmitted symbols.

13. A non-transitory computer-readable storage device storing computer-executable instructions which, when executed by a processor of a computing device, causes the processor perform a method for use in determining estimates for transmitted symbols from received symbols of an optical signal affected by cross-polarization Modulation, XpolM, wherein a transmission of transmitted symbols is organized in repetitive symbol intervals, wherein two transmit symbols are transmitted per symbol interval using different polarizations of the optical signal, wherein two received symbols are received per symbol interval, comprising the steps of:

grouping two or more subsequent received symbols from the optical signal into a group of received symbols;

said grouping step including grouping received symbols of two or more symbol intervals into the group of received symbols, and grouping received symbols from symbol intervals corresponding to a time period, which is less than a coherence time of the optical channel, into the group of received symbols;

estimating an optical channel based on the group of received symbols and a hypothesis on the transmitted symbols;

determining a reliability measure for a combination of the group of received symbols, the channel estimate, and the hypothesis; and determining the estimates for the transmitted symbols based on reliability measures for multiple hypotheses on the transmitted symbols.

\* \* \* \* \*